Oct. 8, 1940.                K. BRATRING                 2,217,213
            APPARATUS FOR REMOVING ARTICLES FROM MOLDS
                    Filed Dec. 23, 1937        2 Sheets-Sheet 1

Inventor:
Kurt Bratring
By Watson E. Coleman

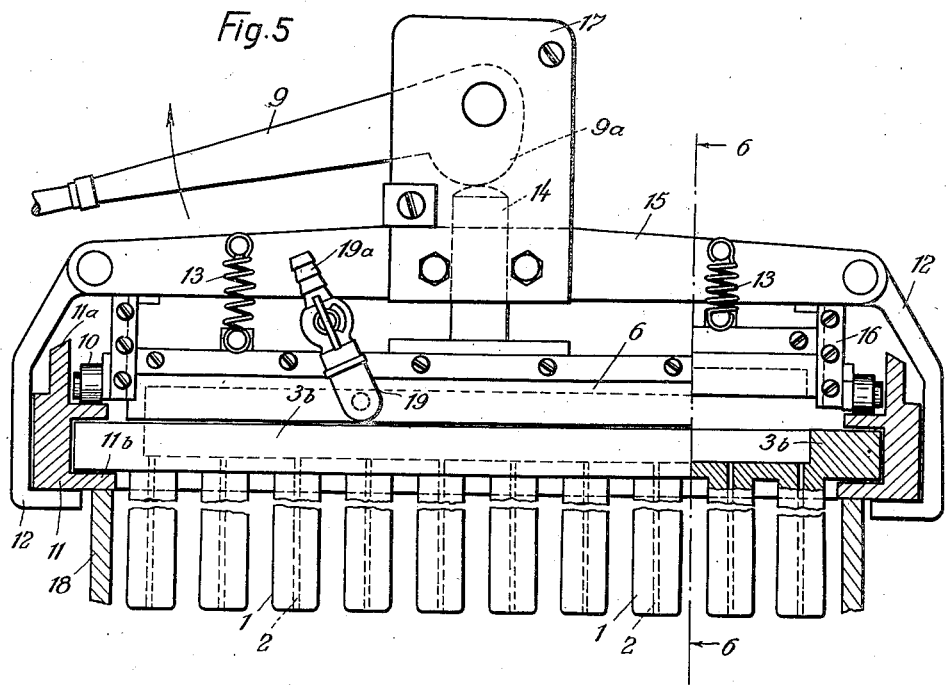
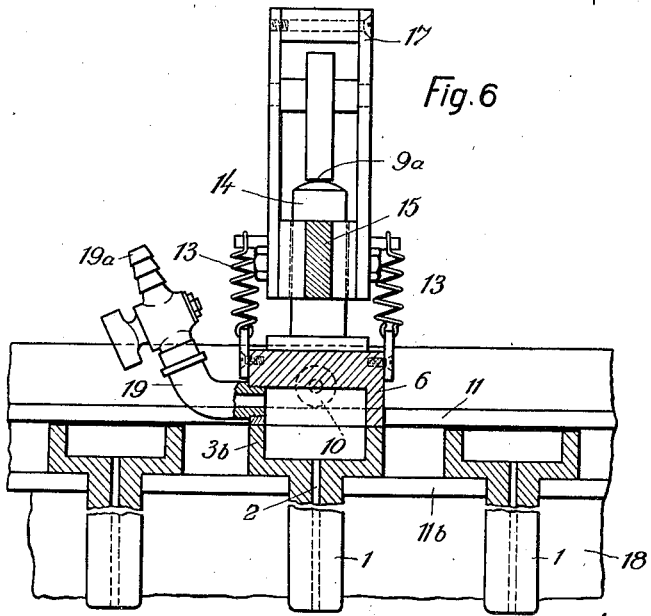

Patented Oct. 8, 1940

2,217,213

UNITED STATES PATENT OFFICE 2,217,213

APPARATUS FOR REMOVING ARTICLES FROM MOLDS

Kurt Bratring, Dahlem, Berlin, Germany, assignor, by mesne assignments, to Neocell Products Corporation, a corporation of Delaware Application December 23, 1937, Serial No. 181,426
In Germany July 27, 1937

10 Claims. (Cl. 18—2)

This invention relates to the removal from their molds, by means of air, of molded articles which are produced by the immersion of molds in a solution of cellulose or other plastic substances and are allowed to dry on the molds; an aim of the invention being to provide an arrangement by which frames, each containing a large number of molds, may be dipped, to form articles, and dried and the articles then rapidly removed from the molds.

In this connection difficulties are encountered only in the removal of the molded articles from the molds. It has already been proposed to remove the articles by the action of compressed air introduced through the molds by way of a boring or by hollow design of the molds and by perforation of the bottom of the mold to permit of the passage of air. Up to now, however, removal of the molded articles from the molds in this fashion has been possible only by placing the molds singly in communication with a compressed air pipe. Thus, for example, in one prior proposal designed to blow off the molded articles from the molds by compressed air it is necessary to remove the molds singly by hand from the immersion frame, to blow off the hollow molded articles one after the other, and then to replace the molds by hand in the supports or frames for the next immersion. Owing to the delay incurred by the manual operation the entire process of manufacture is considerably slowed down. Apart from this, considerable breakage is caused during the different manipulations with the single molds, particularly if the molds consist of glass, or also other damage may be caused impairing the condition of the walls of the articles produced.

It is the object of the invention to eliminate the intermediate manual operation and the individual treatment from the process of manufacture, and to provide an apparatus by means of which the articles can be removed from the molds in a continuous operation, in the form of an extended series or grouped in a frame.

In the accomplishment of this object the invention accordingly consists in an apparatus for removing molded articles produced in an immersion process from their molds by means of air, wherein the molds are furnished, above that portion which is immersed in the substance from which the molded articles are produced, with holding and sealing flanges, which act as adaptation surfaces for connection with a device for subjecting the molds to the action of air pressure or a vacuum.

If the molds are suspended in series or belt-like form in the bath the holding and sealing flanges are so designed at the outset that a plurality of molds can be connected together by means of their flanges so that the latter form a continuous support, the latter then acting both for suspension in the bath as well as in the capacity of a sealing flange and adaptation surface for connection to the device in which the articles are removed from the molds.

Certain embodiments of the invention are illustrated by way of example in the accompanying drawings.

Fig. 5 shows, partially in section, an embodiment of a device for removing a plurality of articles from their molds simultaneously.

Fig. 6 is a cross-sectional view on line 6—6 of Fig. 5.

Figure 1:
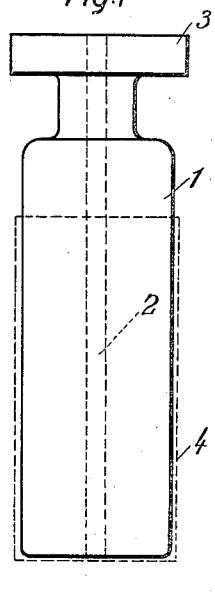
Fig. 1 is a diagrammatical view of a single mold.

Fig. 1 shows a mold 1 having a duct 2 for passage of the air employed for removal of the article 4. Above the portion of the mold which is immersed in the substance from which the molded article is formed there is provided a flange 3, by means of which the mold can be suspended in the substance and the outer face of the flange can be designed to constitute a sealing face.

Figure 2:
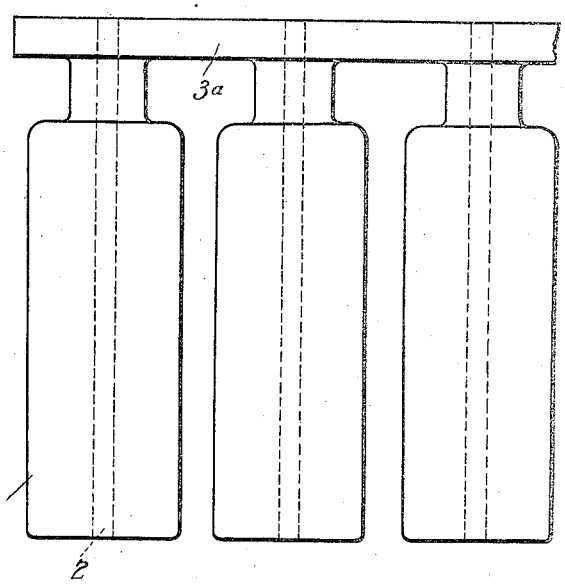
Figs. 2 to 4 show a plurality of molds combined on a continuous support.

Fig. 2 shows the combination of a plurality of molds with their flanges constituting a continuous or one-piece support 3a. The ducts in the molds pass through the supports.

Figure 4:
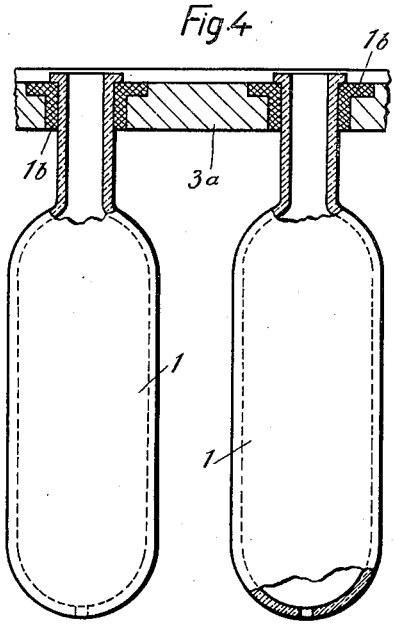
Figure 3:
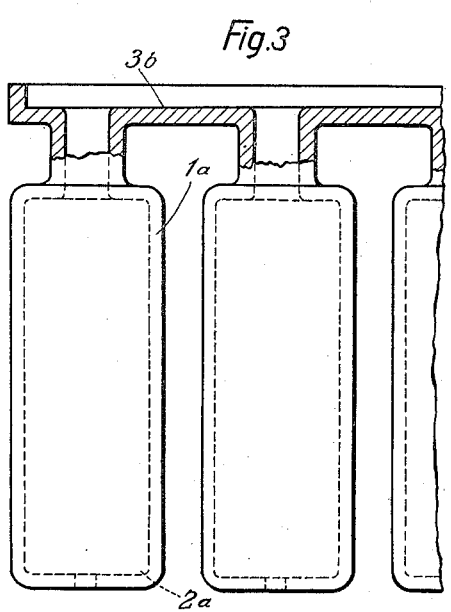

A modification is shown in Fig. 3, in which the molds are constructed as hollow bodies having an opening in the bottom, whilst the support 3b is furnished with a cavity for even distribution of the pressure to the openings leading to the molds. Fig. 4 illustrates the use of hollow glass bodies to act as molds 1, which are connected to the support 3a with the interposition of rubber sleeves 1b. The supports 3, 3a and 3b in Figs. 1 to 4 are so dimensioned with regard to their outer faces that they can be employed not only for suspension of the molds in the bath, but also to act as sealing flange for attachment to the device for removing the articles from the molds.

In combining a plurality of molds to form a continuous support it is desirable to make the openings in the bottoms of the molds so small that even when the majority of the molded articles have been removed from the molds the holding effect of the increased or reduced pressure is not appreciably decreased, so that the articles will be removed in reliable fashion even up to the final article.

The selection of the material and the supporting power of the flanges, whether the latter are employed singly or are combined to form a one piece support, will depend on the bending strain imposed on the support in the bath and the pressure and sealing conditions in the device for removing the articles from the molds.

To assist the supporting power of the flanges or support there may be provided grid-like or grate-like structures, which do not enter into contact with the sealing faces.

In an additional embodiment of the invention the supports for the molds are mounted in a frame 11, by means of which the molds are suspended in the bath containing the substance from which the molded articles are produced. On this frame 11 the removal device, which comprises a cross head 15 and a cover box 6 shiftable upwards and downwards in guides 16 in this cross head, is mounted to be shiftable by means of rollers 10 or equivalent means, in such fashion that the molded articles can be removed simultaneously from the row or group of molds when subjected to the action of the air. The cover box 6 is suspended on springs 13, which tend to draw the same into the top position shown on the right hand side of Fig. 5. The box 6 is guided by means of a stud 14 in a central sleeve of the cross head 15, and is acted upon by a rocking lever 9, which is mounted between two lugs 17 on the cross head and by means of its eccentric 9a determines in opposition to the action of the springs 13 the position of the cover box 6 in relation to the box-like mold support 3b. In place of the mold support 3b there may also be employed equally as well the mold support 3a according to Fig. 2 or 4. By means of the eccentric 9a there is brought about an airtight seal between the cover box 6 and the mold support 3b, the flanges 11b of the frame 11 acting as bearing faces and the cross head 15 engaging by means of the pivotal clamps 12 below the flange 11b of the frame. The interior of the cover box 6 communicates by means of an outlet 19 terminating in a pipe connection 19a with a compressed air source.

The operation of the apparatus is as follows:

The molded articles are produced by immersion of the molds in a solution of cellulose or other plastic substance, and drying, in the well known manner. The support bearing the molds is then mounted in the frame 11 in the manner shown in Fig. 5. Thereupon the cross head 15 carrying the cover box 6 (Figs. 5 and 6) is moved into registry with the support 3b of one row of molds and the lever 9 is rocked into position, as shown in Figs. 5 and 6, forcing the parts together so as to seal the box 6 about its periphery against the mold support. Thereupon by opening the cock 19, air is admitted under pressure to the cavity formed by the members 6 and 3b, enters all of the ducts 2 as above described in the various molds, and acts evenly on the articles to blow them off their molds.

When the articles have been blown off under the action of the compressed air the lever 9 is lifted. The springs 13 thereupon lift the cover box 6 from the support 3b bearing the molds which have been treated, and the removal device may now be shifted on the rollers 10 into a position over another group of molds.

The vertical extension 11a of the frame 11 operates as a guide for the adjacent roller 10 and the inward extension 11b from each side of the member 11 serves as a means for mounting the frame upon the edge of the receptacle into which the molded articles are blown. The hooks 12, as previously stated, remain in securing position while the box 6 is being shifted and while the blowing off operation is being carried out.

As is clearly shown in Fig. 5, the area above each flange or inward extension 11b constitutes an inwardly opening channel which is opposed to the channel of the other member 11, and these channels receive opposite edges of the webs or supports 3a, 3b which carry the molds so that the molds will be suspended in the desired manner within the bath 18 and also in the proper manner to facilitate bringing the box 6 into the desired peripheral engagement with the mold support.

In place of the introduction of compressed air through the outlet 19 it is also possible to evacuate the receptacle in which the removed articles are received. Upon opening the cock at the outlet 19 the articles are then blown off from the molds 1 as under the effect of compressed air. In making use of evacuation of the container the wall of the latter must be sealed against the flange 11b of the frame 11. The seal between the flange 11b and the support 3b is brought about under the action of the eccentric 9a in similar fashion to the seal between the support 3b and the cover box 6.

If desired, sealing packings or sealing coatings may be employed on the two adaptation faces of the mold support 3b.

It will be understood that no limitation is made to the specific forms of embodiment illustrated in the drawings, and that numerous modifications are quite possible within the meaning of the above description and the annexed claims without departing from the spirit of the invention.

What I claim as new and desire to secure by Letters Patent is:

1. In an apparatus for removing hollow dip formed articles from molds, a plurality of core molds for forming bodies by the immersion process, each mold having a duct extending from the top of the mold to and through the bottom thereof, the upper end portions of all of said molds being connected by an integral web having upstanding lateral and end flanges, the faces of the upstanding flanges being smooth, and means so constructed and arranged that it may have sealing contact with the said smooth faces of the flanges for applying fluid pressure through the passages of said molds.

2. An apparatus for removing hollow dip-formed articles from molds, comprising a frame having laterally spaced inwardly opening channels, and a plurality of depending molds, each mold having a duct extending from the top of the mold to the bottom thereof, the upper ends of all of the molds being connected by an integral web extending laterally beyond said flanges and engaging at opposite edges in said channels, and means on the frame for establishing an air pressure differential between the interiors of said ducts and the exteriors of formed articles on the molds for effecting removal of the articles.

3. In a structure of the character described, a supporting frame having laterally spaced inwardly opening channels, a plurality of molds carried by said frame, the molds having an integral web recessed upon its upper face, the web extending beyond the molds and into said channels of the frame, each mold having a duct extending through the mold from the face of said recess to the under end face of the mold, a cross-bar extending above the channels and having pivoted elements hooking below the laterally disposed frame elements, a header mounted upon said cross-bar for vertical movement, the header being recessed upon its under face to register with the recessed face of said web and have air-tight contact with said web when depressed, the header having a tap, springs urging the header upward, and means carried by the cross-bar for forcing the header downward into air-tight contact with the web.

4. A structure as described in claim 3, including a lever having a cam at its inner end and the header having an upstanding pin with which said cam engages to force the header downward.

5. In an apparatus for removing hollow dip formed articles from molds, a frame, molds attached to the frame and each provided with an air passage extending entirely through the same, means for supporting the frame, a chamber body supported adjacent said frame, said body being so constructed and arranged that communication may be established between the chamber and the air passages of the molds, and means facilitating connection of a source of fluid pressure with said chamber whereby said pressure may be transmitted from the chamber to said passages for the simultaneous removal of said articles from the molds.

6. In an apparatus for removing hollow dip formed articles from molds, a plurality of core molds for forming bodies by the immersion process, each mold having a duct extending from the top of the mold to and through the bottom thereof, an integral web connecting the upper end portions of all of said molds and having upstanding side and end flanges, the upper faces of said flanges being smooth, a header arranged to be positioned across the plurality of molds and having a chamber opening toward the same, the said chamber at the open side thereof being bounded by a surface formed for sealing contact with the said faces of said flanges, and means for coupling a source of fluid pressure to the chamber.

7. In an apparatus for removing hollow dip formed articles from molds, a plurality of molds, means joining said molds into a unitary body, each of said molds having a passage therethrough, chamber means which is so constructed and arranged that it may be placed into communication with the passages of all of the molds whereby an air pressure differential may be established between the interiors of said passages and the exteriors of molded bodies on the molds to effect removal of all of the bodies from the molds, and said passages being of a diameter whereby upon establishment of such differential pressure the removal of one article from a mold will not alter the differential effect upon the other articles to an extent to prevent their removal.

8. In apparatus for removing from molds hollow articles formed by dipping, a supporting structure, a frame adapted to be mounted upon said structure, molds each provided with an air channel, attached to the frame, and a chamber adapted to be connected to a source of pneumatic pressure, the said frame when in position upon the supporting structure having the said air channels in the molds pneumatically connected with the chamber whereby air under pressure may be transmitted from the chamber to and through the channels of the molds.

9. In apparatus for removing dip-formed articles from molds, a web, a plurality of molds depending from said web, each of said molds having a duct therethrough and opening at the upper face of said web, a header open on its under face and movable into position above said web, the header being constructed and arranged to have sealing contact with the said web, means whereby the header may be connected to a source of air under pressure, and means for moving the header into air-tight engagement with the web.

10. In apparatus for removing dip-formed articles from molds, a web, a plurality of molds depending from said web, each of said molds having a duct extending therethrough from the upper face of said web to the outside of said mold, a header recessed on its under face and constructed and arranged to have sealing contact with said web, means for moving said header into sealing contact with said web, the recessed header and the web together providing an air chamber connecting with said ducts, and means for delivering air under pressure to said chamber.

KURT BRATRING.